(No Model.)
A. PRAGER.
BICYCLE.
No. 586,367. Patented July 13, 1897.
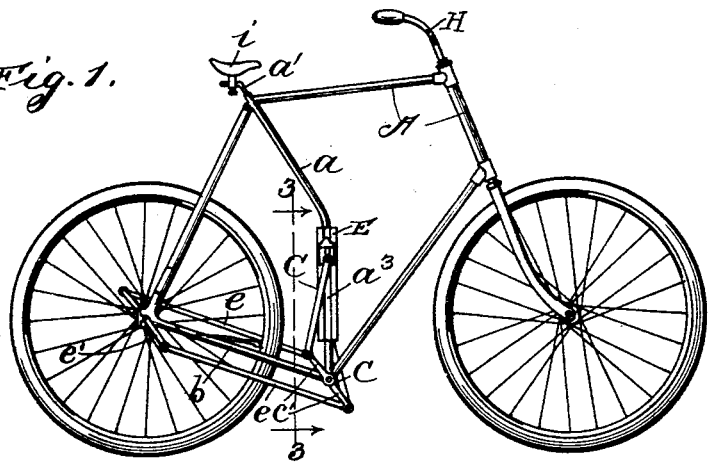
Fig. 1.
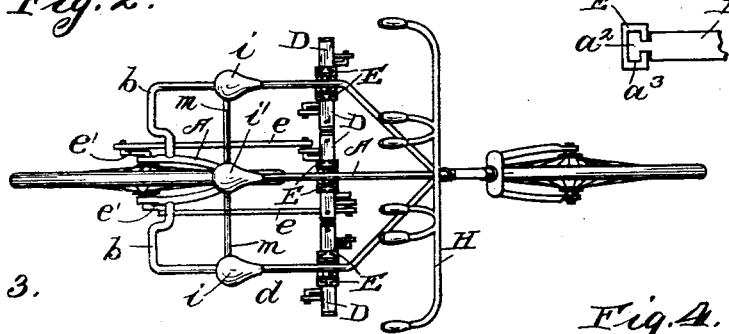
Fig. 2.
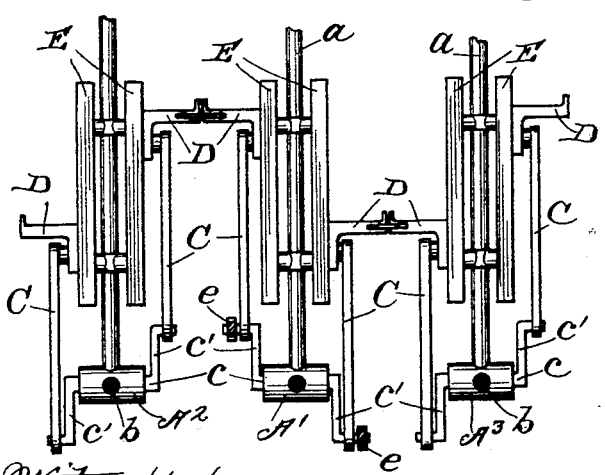
Fig. 3.
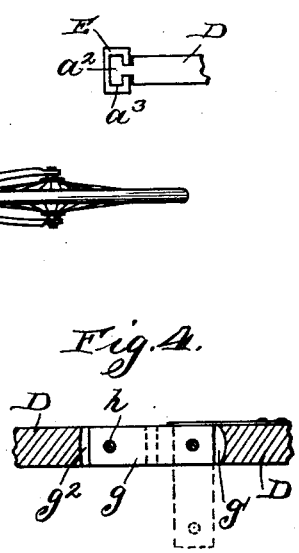
Fig. 6.
Fig. 4.
Fig. 5.
Witnesses:
R. J. Jaeter.
E. A. Duggan.
Inventor:
Anton Prager.
By Chas. C. Tillman
Atty.

UNITED STATES PATENT OFFICE.

ANTON PRAGER, OF CHICAGO, ILLINOIS.

BICYCLE.

SPECIFICATION forming part of Letters Patent No. 586,367, dated July 13, 1897.

Application filed March 22, 1897. Serial No. 628,642. (No model.)

*To all whom it may concern:*

Be it known that I, ANTON PRAGER, a subject of the Emperor of Austria-Hungary, residing at Chicago, in the county of Cook and State of Illinois, have invented certain new and useful Improvements in Bicycles, of which the following is a specification.

This invention relates to improvements in the construction of a bicycle or pedomotive machine to carry three persons and to be driven or propelled by one, two, or all three, as occasion may require; and it consists in certain peculiarities of the construction, novel arrangement, and operation of the various parts thereof, as will be hereinafter more fully set forth and specifically claimed.

The machine illustrated in the drawings and herein described is shown as a bicycle or two-wheeled vehicle, and while my invention is more especially intended for use on such a vehicle, yet it may be employed on tricycles and other vehicles.

In order to enable others skilled in the art to which my invention pertains to make and use the same, I will now proceed to describe it, referring to the accompanying drawings, in which—

Figure 1 is a view in side elevation of a bicycle embodying my invention. Fig. 2 is a plan view thereof. Fig. 3 is a view, partly in section and partly in elevation, taken on line 3 3 of Fig. 1, but showing only a portion of the vehicle. Fig. 4 is a plan sectional view of a portion of two of the pedals or foot-rests, showing the manner of detachably securing them together. Fig. 5 is a side view of a portion of two of the foot-rests, showing them secured together; and Fig. 6 is a horizontal sectional view of one of the upright or guide pieces and a portion of one of the foot-rests or pedals.

Similar letters refer to like parts throughout the different views of the drawings.

A represents the main frame of a bicycle, which frame is of the ordinary construction, except that the central tube $a$, which receives at its upper end the seat-post $a'$, rises vertically from the crank-hanger A', and is then inclined rearwardly, as shown in Fig. 1 of the drawings.

Secured to the lower portion of the frame A and on each side thereof is a tube or piece $b$, which extends outwardly from the rear fork and then forwardly parallel with the frame A and is then bent inwardly and connected to the frame at a point above the wheel. The said pieces $b$ when so connected form a part of the frame of the vehicle. On the frame are secured three crank-hangers $A'$ $A^2$ $A^3$, in each of which is journaled a crank-axle $c$, having at its ends cranks $c'$, to which are pivotally secured rods or bars C, whose upper ends are pivotally secured to the pedals or foot-rests D, which are formed or provided with enlargements $a^2$ (see Figs. 2 and 6) to fit and operate in the grooves $a^3$ of the upright pieces E, which are secured on each side of the tubes $a$, which rise from the crank-hangers in a perpendicular line to about their middle and are then bent or inclined rearwardly and receive the seat-posts $a'$ in their upper ends, as is shown in Fig. 1 of the drawings. Secured to the cranks on the central crank-axle are pitmen or connecting-rods $e$, which are pivotally secured at their rear ends to cranks $e'$ on the axle of the rear wheel, which wheel is rigidly secured on said axle.

The foot-rests D, between the central post or tube $a$ and the outer posts or tubes, where the seats are mounted, are united to the adjacent pedals on the outer posts by means of a bar $g$, which is pivotally secured at one of its ends in a slot $g'$ in one of the foot-rests and has its other end extending into a slot $g^2$ in the adjacent foot-rest, where it may be secured by means of a bolt and nut $h$, passing through said bar and one of the foot-rests or pedals. The handle-bar H is provided, as shown, with six handpieces, two for each of the riders, which are used by crossing the arms of the riders on their adjacent sides, so as to grasp the alternate handpieces.

From the foregoing and by reference to the drawings it will be seen and clearly understood that when the foot-rests or pedals between the central uprights and the uprights on the outer posts are connected by means of the pivoted bars $g$ the force exerted by each rider will be concentrated on the central crank-axle, which is connected, as before stated, with the cranks on the axle of the rear wheel by means of the pitmen $e$, and will propel the machine by very little exertion on the part of either of the riders.

When it is desired that the machine may be used by two riders, they should occupy the seats $i$ on the sides of the frame, yet permit the pedals or foot-rests on the uprights of the outer posts or tubes to be connected to the pedals or foot-rests on the central uprights. If it is desired that one rider only shall use the machine, he should occupy the central seat $i'$, and the foot-rests or pedals should be disconnected from the adjacent foot-rests or pedals by removing the bolt $h$ and turning the bar $g$ out of engagement or to the position shown by dotted lines in Fig. 4 of the drawings. It is apparent that the grooves in the uprights $a^2$ will guide the foot-rests or pedals in a vertical direction and that the enlargements $a^3$, which fit within the grooves, will prevent their dislocation.

The posts or tubes $a$ are connected by means of cross bars or rods $m$ and may be supported on the main frame in any suitable manner.

Having thus fully described my invention, what I claim as new, and desire to secure by Letters Patent, is—

1. In a bicycle, the combination with three crank-axles journaled on the main frame, each having cranks, of a crank-axle for the rear wheel, pitmen or connecting-rods pivotally secured to the cranks of the rear axle and similarly secured to the cranks of the center crank-axle, vertical guideways located above the crank-axles, a pedal or foot-rest movably secured in each of said guideways, and rods pivotally connected to the pedals and the cranks of the crank-axles, and means to connect the pedals on the central uprights, with the pedals adjacent thereto, substantially as described.

2. In a bicycle, the combination with three crank-axles journaled on the main frame, each having cranks, of a crank-axle for the rear wheel, pitmen or connecting-rods pivotally secured to the cranks of the rear axle and similarly secured to the cranks of the center crank-axle, vertical guideways located above the crank-axles, a pedal or foot-rest movably secured in each of said guideways, and rods pivotally connected to the pedals and the cranks of the crank-axles, and the bars $g$, pivotally secured on one of the pedals or foot-rests, and adapted to be placed in engagement with the adjacent foot-rest, substantially as described.

ANTON PRAGER.

Witnesses:
CHAS. C. TILLMAN,
E. A. DUGGAN.